United States Patent [19]

Tamamura

[11] Patent Number: 5,155,514
[45] Date of Patent: Oct. 13, 1992

[54] CARTRIDGE LOADING CHAMBER

[75] Inventor: Hideo Tamamura, Yokohama, Japan

[73] Assignee: Canon Kabushiki Kaisha, Tokyo, Japan

[21] Appl. No.: 737,981

[22] Filed: Jul. 30, 1991

[30] Foreign Application Priority Data

Aug. 1, 1990 [JP] Japan .............................. 2-205832

[51] Int. Cl.⁵ .............................................. G03B 19/10
[52] U.S. Cl. ..................................................... 354/174
[58] Field of Search .................................. 354/174, 288

[56] References Cited
U.S. PATENT DOCUMENTS
4,841,319 6/1989 Hansen .......................... 354/288 X Primary Examiner—Richard A. Wintercorn
Assistant Examiner—Howard B. Blankenship
Attorney, Agent, or Firm—Fitzpatrick, Cella, Harper & Scinto

[57] ABSTRACT

A camera provided with a loading chamber for loading a cartridge housing an image recording medium, a cover member for covering a cartridge loading aperture of the loading chamber, a resilient member for biasing the cartridge loaded in the loading chamber toward the loading aperture, and a support member for supporting the cartridge in the loading chamber against the biasing force of the resilient member and releasing the supporting action, in response to a movement of the cover member in a direction to open the loading aperture.

32 Claims, 3 Drawing Sheets

CARTRIDGE LOADING CHAMBER

BACKGROUND OF THE INVENTION

1. Field of the Invention

The present invention relates to a camera, and more particularly an improvement in the structure for loading a cartridge, incorporating image recording means such as a photographic film, into a camera body.

2. Related Background Art

A camera employing a cartridge in which a photographic film is entirely housed therein is already proposed in the U.S. Pat. No. 4,841,319.

However, such prior technology has been associated with the following drawbacks that:

1) When the cartridge is loaded in a cartridge chamber of the camera, the operator cannot be sure whether the cartridge is exactly and firmly fitted in a proper position in the cartridge chamber; and 2) after the phototaking operation, the camera has to be inverted in order to extract the cartridge from the cartridge chamber of the camera, and the camera has to be tapped if the cartridge engages with friction with the chamber, and such operation eventually leads to mechanical troubles.

SUMMARY OF THE INVENTION

In consideration of the foregoing, the object of the present invention is to provide a camera, provided with a loading chamber for loading a cartridge housing image recording means, a cover member for covering an aperture for cartridge loading in said loading chamber, resilient means for biasing the cartridge loaded in said loading chamber toward said loading aperture, and support means for supporting said cartridge in said loading chamber against the biasing force of said resilient means and also capable of releasing said supporting action by moving said cover member in a direction to open said loading aperture, whereby the cartridge can be exactly loaded and fixed in an appropriate position in the loading chamber of the camera and can be easily removed therefrom.

Other objects of the present invention will become fully apparent from the following description of the preferred embodiments.

DETAILED DESCRIPTION OF THE PREFERRED EMBODIMENTS

Now the present invention will be clarified in detail by an embodiment thereof shown in the attached drawings.

Figure 1:
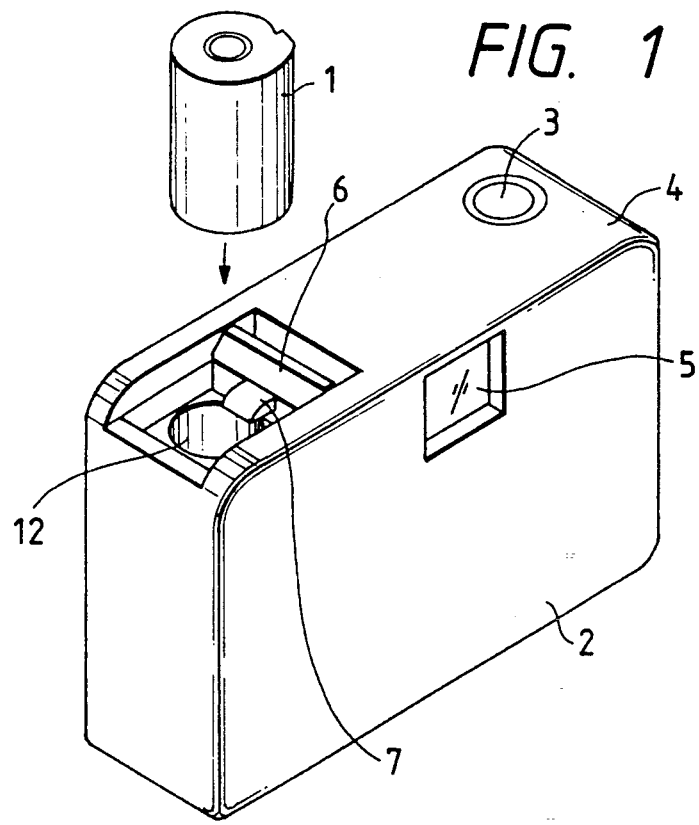
FIG. 1 is a perspective view of a camera embodying the present invention.
Figure 2:
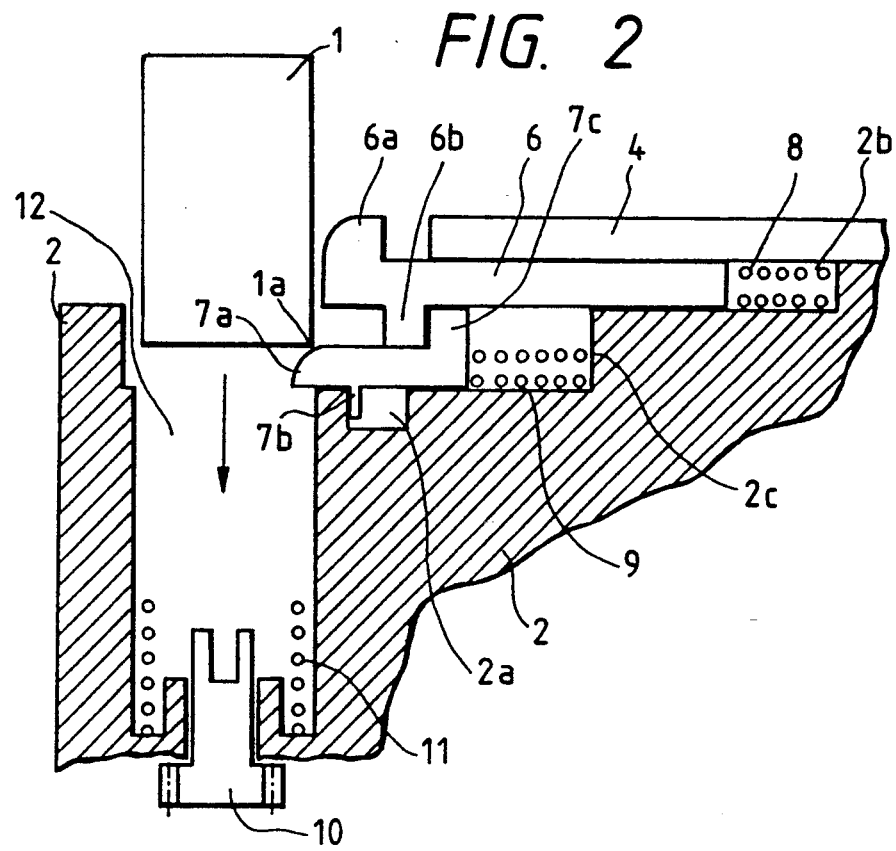
FIGS. 2 to 6 are longitudinal magnified partial cross-sectional views of the camera shown in FIG. 1.

FIG. 1 is a perspective of a camera of the present embodiment, and FIG. 2 is a longitudinal magnified partial cross-sectional view of the camera shown in FIG. 1.

In FIGS. 1 and 2, there are shown a cartridge 1 incorporating the entire film constituting image recording means; a camera body 2; a shutter release button 3; an upper cover member 4 of the camera body; a view finder 5; a loading chamber 12 for the cartridge 1; a cover member 6 provided with protruding portions 6a, 6b, for covering a cartridge loading aperture of the loading chamber 12; a lock lever 7 constituting support means and provided with a sloped face 7a and protruding portions 7b, 7c; springs 8, 9; member 10 driven by a feeding motor for forwarding the film from the cartridge 1 in the auto loading operation and rewinding said film after the phototaking operations; and a spring 11 provided in the loading chamber and fixed at an end to the lower end of the loading chamber 12.

The function of the above-explained structure will be explained in the following with reference to FIGS. 2 to 6.

At the cartridge loading, the cover member 6 is moved to the right to fully open the loading aperture of the loading chamber 12 as shown in FIG. 2. In such fully opened state of the cover member 6 as shown in FIG. 2, the cover member 6 merely touches the spring 8, and is not subjected to the pressure thereof. When the cartridge 1 is inserted into the loading chamber 12 as indicated by an arrow, an end 1a of the cartridge 1 pushes the sloped face 7a of the lock lever 7, thereby pushing the lock lever 7 to the right against the force of the spring 9, and the cartridge 1 moves downwards into the loading chamber 12.

Figure 3:
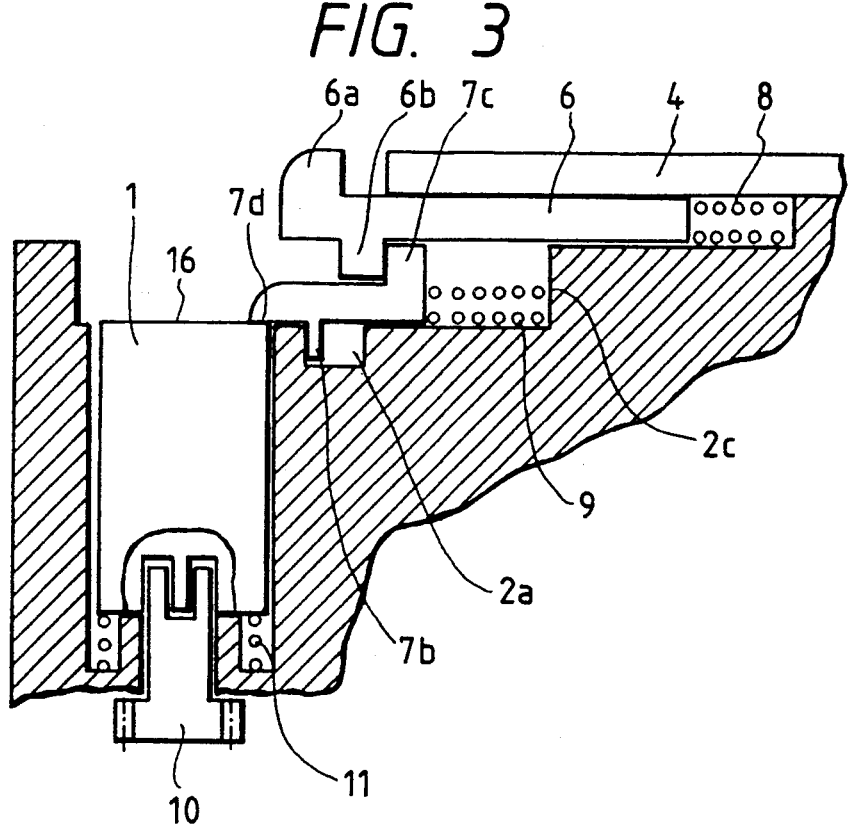

When the cartridge 1 descends to an engaging position with the fork member 10 as shown in FIG. 3, the lock lever 7 advances by the force of the spring 9 onto the upper face of the cartridge 1, thereby fixing the cartridge 1 in the loaded position against the force of the spring 11.

The lock lever 7 is stopped by the impingement of the protruding part 7b on an end of a groove 2a formed in the camera body.

Figure 4:
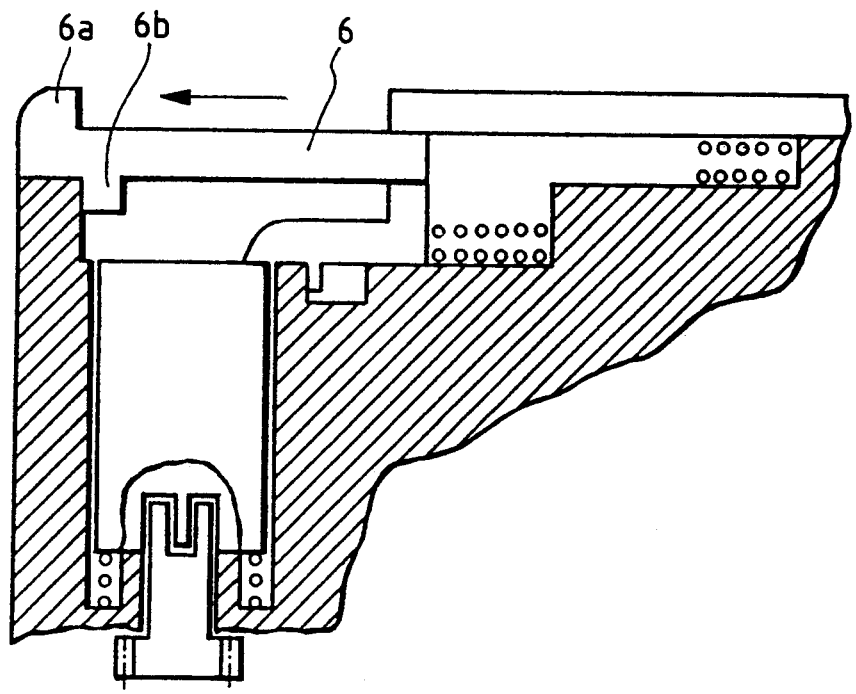

Subsequently the cover member is closed as indicated by an arrow in FIG. 4, whereby the aperture of the loading chamber 12 is sealed against light, and the cartridge loading is completed.

Figure 5:
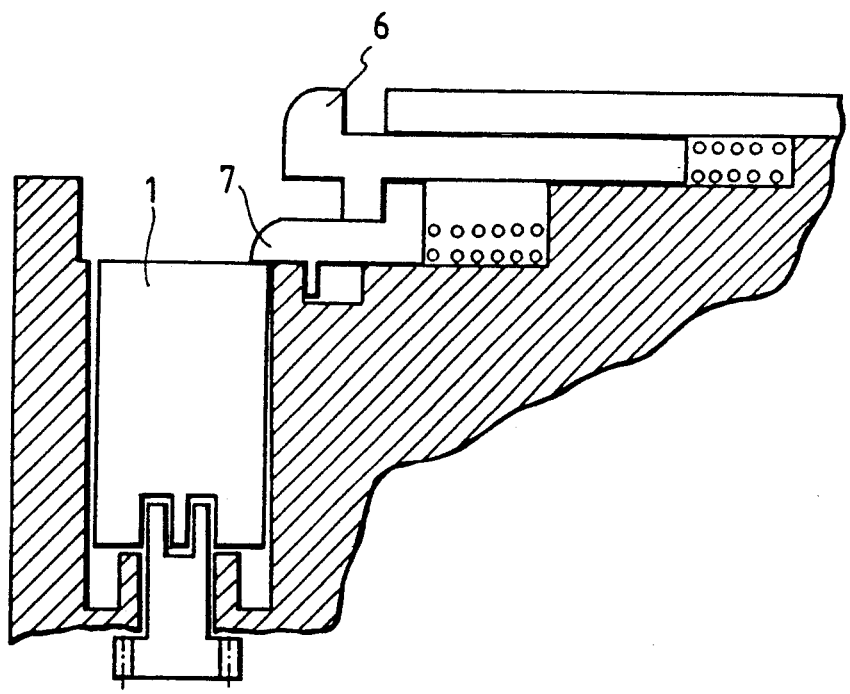

For removing the cartridge after the photo-taking operation, the cover member 6 is moved to the right as shown in FIG. 5, thereby fully opening the cartridge loading aperture.

In this state the cartridge remains in the loaded state, as it is still supported by the lock lever 7.

Figure 6:
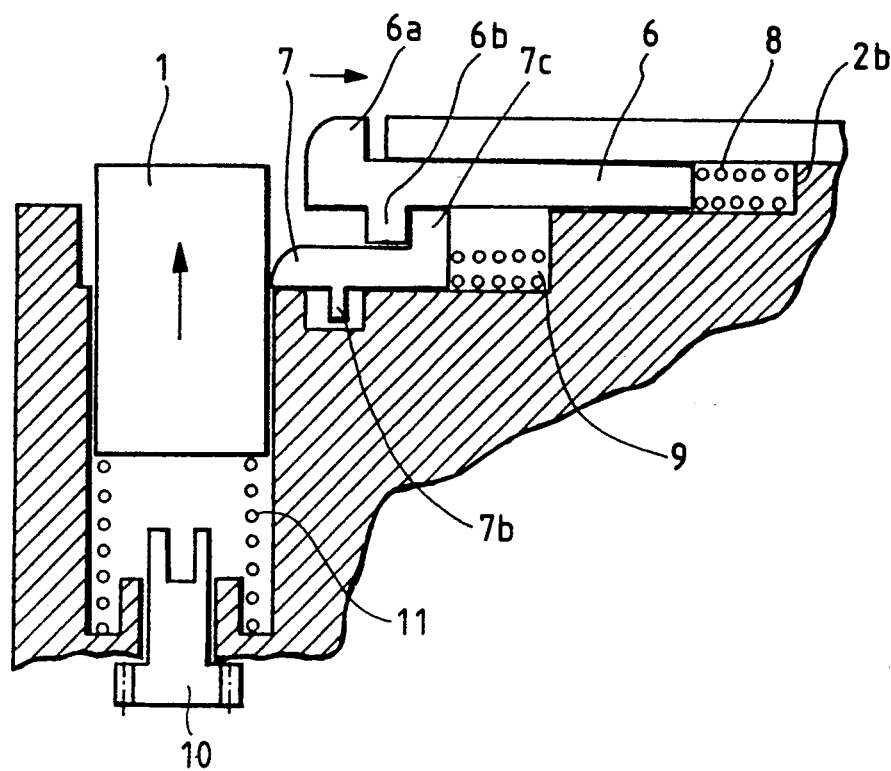

Then, as shown in FIG. 6, the cover member 6 is pushed further in the opening direction indicated by an arrow, against the force of the spring 8. Thus the protruding portion 6b of the cover member 6 pushes the protruding portion 7c of the lock lever 7 to move said lock lever in the direction of arrow against the force of the spring 9, thereby disengaging the cartridge 1. Thus the cartridge 1 is lifted by the spring 11 to a position shown in FIG. 6, whereby a part of the cartridge 1 protrudes from the loading chamber 12. Thus protruding cartridge can be manually removed. Thereafter the lever 7 and the cover member 6 return to the state shown in FIG. 2, by means of the springs 8, 9.

As explained in the foregoing, the present embodiment provides a camera that can exactly load and fix a cartridge housing image recording means in a proper loading position and can allow easy removal of said cartridge.

In the foregoing description the cartridge is loaded from above the camera body, but the present invention is likewise applicable to structure in which the cartridge is loaded from below or from side of the camera body.

Also in the foregoing description, the cover member 6 and the lock lever 7 are shown in sliding structure, but the present invention is naturally applicable to other structures such as rotatable ones.

What is claimed is:

1. A camera comprising:
   a) a loading chamber for loading a cartridge housing an image recording medium;
   b) a cover member for covering a cartridge loading aperture of said loading chamber;
   c) resilient means for biasing the cartridge, loaded in said loading chamber, toward said loading aperture; and
   d) support means for supporting said cartridge in said loading chamber against the biasing force of said resilient means, said support means releasing said supporting action by the movement of said cover member in a direction to open said cartridge loading aperture.

2. A camera according to claim 1, wherein said image recording medium includes a film.

3. A camera according to claim 1, wherein said cartridge contains all said image recording medium.

4. A camera according to claim 1, wherein said cover member includes means for effecting a sliding movement.

5. A camera according to claim 4, wherein said support means includes means for effecting a sliding movement in response to the sliding movement of said cover member.

6. A camera according to claim 1, wherein said support means includes means for effecting a sliding movement.

7. A camera according to claim 1, wherein said support means includes means for releasing said supporting action in response to a movement of said cover member in a direction to open said cartridge loading aperture beyond a predetermined position.

8. A camera according to claim 7, further comprising biasing means which substantially functions when said cover member is moved in the opening direction beyond said predetermined position, thereby biasing said cover member in the closing direction.

9. A camera according to claim 1, wherein said support means includes means for releasing said supporting action in response to a movement of said cover member in a direction to open said cartridge loading aperture beyond a fully opened position.

10. A camera according to claim 9, further comprising biasing means which substantially functions when said cover member is moved in the opening direction beyond said fully opened position, thereby biasing said cover member in the closing direction.

11. A camera according to claim 1, further comprising biasing means which substantially functions when said cover member is moved in the opening direction beyond a predetermined position, thereby biasing said cover member in the closing direction.

12. A camera according to claim 1, further comprising biasing means which substantially functions when said cover member is moved in the opening direction beyond a fully opened position, thereby biasing said cover member in the closing direction.

13. A camera according to claim 1, further comprising biasing means for biasing said support means in a functioning direction.

14. A camera according to claim 1, wherein said support means includes movement means for releasing said supporting action by a movement.

15. A camera according to claim 14, wherein said movement means includes means for effecting a movement in a direction to release said supporting action, in response to the loading of said cartridge into said loading chamber.

16. A camera according to claim 14, wherein said movement means includes means enabling a movement independent from said cover member.

17. A cartridge loading device comprising:
   a) a loading chamber for loading a cartridge housing an image recording medium;
   b) a cover member for covering a cartridge loading aperture of said loading chamber;
   c) resilient means for biasing the cartridge, loaded in said loading chamber, toward said loading aperture; and
   d) support means for supporting said cartridge in said loading chamber against the biasing force of said resilient means, said support means releasing said supporting action by the movement of said cover member in a direction to open said cartridge loading aperture.

18. A cartridge loading device according to claim 17, wherein said image recording medium includes a film.

19. A cartridge loading device according to claim 17, wherein said cartridge contains all said image recording medium.

20. A cartridge loading device according to claim 17, wherein said cover member includes means for effecting a sliding movement.

21. A cartridge loading device according to claim 20, wherein said support means includes means for effecting a sliding movement in response to the sliding movement of said cover member.

22. A cartridge loading device according to claim 17, wherein said support means includes means for effecting a sliding movement.

23. A cartridge loading device according to claim 17, wherein said support means includes means for releasing said supporting action in response to a movement of said cover member in a direction to open said cartridge loading aperture beyond a predetermined position.

24. A cartridge loading device according to claim 23, further comprising biasing means which substantially functions when said cover member is moved in the opening direction beyond said predetermined position, thereby biasing said cover member in the closing direction.

25. A cartridge loading device according to claim 17, wherein said support means includes means for releasing said supporting action in response to a movement of said cover member in a direction to open said cartridge loading aperture beyond a fully opened position.

26. A cartridge loading device according to claim 25, further comprising biasing means which substantially functions when said cover member is moved in the opening direction beyond said fully opened position, thereby biasing said cover member in the closing direction.

27. A cartridge loading device according to claim 17, further comprising biasing means which substantially functions when said cover member is moved in the opening direction beyond a predetermined position, thereby biasing said cover member in the closing direction.

28. A cartridge loading device according to claim 17, further comprising biasing means which substantially functions when said cover member is moved in the opening direction beyond a fully opened position, thereby biasing said cover member in the closing direction.

29. A cartridge loading device according to claim 17, further comprising biasing means for biasing said support means in a functioning direction.

30. A cartridge loading device according to claim 17, wherein said support means includes movement means for releasing said supporting action by a movement.

31. A cartridge loading device according to claim 30, wherein said movement means includes means for effecting a movement in a direction to release said supporting action, in response to the loading of said cartridge into said loading chamber.

32. A cartridge loading device according to claim 30, wherein said movement means includes means enabling a movement independent from said cover member.

* * * * *